3,355,287
COBALT-BASE ALLOYS

Arthur T. Cape, Monterey, Calif., assignor to Coast Metals, Inc., Little Ferry, N.J., a corporation of Delaware
No Drawing. Filed May 26, 1965, Ser. No. 459,109
3 Claims. (Cl. 75—170)

This invention relates generally to cobalt-base alloys intended to be used for hard facing and brazing purposes, but has reference more particularly to cobalt-base alloys containing substantial amounts of iron, and small, but effective amounts of silicon and boron.

The alloy of my invention was designed originally for vacuum brazing and is surprisingly tough, forming joints which, while hard, require a great deal of effort to break by pulling apart the brazed sections. For example, the alloy was used to braze together parallel tubes of No. 347 stainless steel, and it was found that in attempting to pull such tubes apart, the brazed joint did not fail, but the tubes were ripped apart.

It was also found that the alloy of the invention is excellent for hard facing or overlay uses, such, for example, as coating the teeth of chain saw blades. The hardened chain links slide easily over the edges coated with the alloy, and the wear is much less than that of Stellite No. 6, which was the material normally used for this purpose.

The alloys of my invention have the following nominal composition:

| | Percent |
|---|---|
| Carbon | .05 to 2 |
| Silicon | 0.5 to 5 |
| Boron | 1 to 3.5 |
| Iron | 18 to 32 |
| Cobalt | Remainder |

A preferred alloy, within the aforesaid range consists of about .08% carbon, about 3.11% silicon, about 2.9% boron, about 24% iron, and about 69.2% cobalt.

This preferred alloy has a melting point of 1950 to 1975° F., and a Rockwell C hardness of 65/67.

It is essential that the alloy contain a minimum of 64% cobalt, so that the total of the other constituents of the alloy cannot exceed 36%, by weight, of the alloy. The alloy may include, as optional ingredients, one or more of the elements manganese, molybdenum, tungsten, chromium, and nickel, but the aggregate amount of these should not exceed about 5%, with no one of such ingredients being present in excess of 2.5%.

The unusual properties of this alloy are derived, in great part, from the substantial amount of iron present in the alloy.

It will be understood that various changes may be made in the alloys, without departing from the spirit of the invention or the scope of the appended claims.

Having thus described my invention, I claim:
1. A cobalt-base alloy, especially adapted for hard facing and brazing purposes, said alloy consisting of from .05 to 2% carbon, 0.5 to 5% silicon, 1 to 3.5% boron, 18 to 32% iron, and the remainder essentially all cobalt, the minimum amount of cobalt being 64%.
2. A cobalt-base alloy, as defined in claim 1, containing up to a total of not more than 5% of one or more of the elements manganese, molybdenum, tungsten, chromium, and nickel, with no one of such elements being present in an amount in excess of 2.5%.
3. A cobalt-base alloy, especially adapted for hard facing and brazing purposes, said alloy consisting of about .08% carbon, about 3.11% silicon, about 2.9% boron, about 24% iron, and about 69.2% cobalt.

References Cited
UNITED STATES PATENTS

| 2,714,760 | 8/1955 | Boam et al. | 75—170 |
| 2,757,084 | 7/1956 | Cape et al. | 75—170 |
| 2,899,302 | 8/1959 | Cape et al. | 75—170 |
| 2,936,229 | 5/1960 | Shepard | 75—170 |

DAVID L. RECK, *Primary Examiner.*
RICHARD O. DEAN, *Examiner.*